(12) United States Patent
Dudar

(10) Patent No.: US 10,598,060 B2
(45) Date of Patent: Mar. 24, 2020

(54) METHODS AND SYSTEMS FOR REMOVING MOISTURE FROM ENGINE EXHAUST SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/902,946

(22) Filed: Feb. 22, 2018

(65) Prior Publication Data

US 2019/0257231 A1   Aug. 22, 2019

(51) Int. Cl.
| | |
|---|---|
| *F01N 3/00* | (2006.01) |
| *F01N 13/10* | (2010.01) |
| *F02D 41/02* | (2006.01) |
| *B60K 13/04* | (2006.01) |
| *F02B 39/10* | (2006.01) |
| *F02D 41/04* | (2006.01) |
| *F02D 41/14* | (2006.01) |
| *F02D 41/00* | (2006.01) |

(52) U.S. Cl.
CPC .............. *F01N 3/005* (2013.01); *B60K 13/04* (2013.01); *F01N 13/10* (2013.01); *F02B 39/10* (2013.01); *F02D 41/024* (2013.01); *F02D 41/042* (2013.01); *F01N 2510/08* (2013.01); *F01N 2900/1628* (2013.01); *F02D 41/0007* (2013.01); *F02D 2041/1472* (2013.01); *F02D 2200/70* (2013.01)

(58) Field of Classification Search
CPC combination set(s) only.
See application file for complete search history.

(56) References Cited

U.S. PATENT DOCUMENTS

| | | | |
|---|---|---|---|
| 5,027,001 A | 6/1991 | Torbert | |
| 6,392,218 B1 | 5/2002 | Kuehnle | |
| 6,817,329 B2 | 11/2004 | Buglione et al. | |
| 8,910,476 B2 * | 12/2014 | Nam | F02M 25/0227 60/605.2 |
| 9,097,194 B2 * | 8/2015 | Suzuki | F02D 41/1494 |
| 9,267,423 B2 | 2/2016 | Russ et al. | |

(Continued)

FOREIGN PATENT DOCUMENTS

WO   9914088 A1   3/1999

OTHER PUBLICATIONS

Birch, S., "Testing Audi's new e-booster reveals turbocharging's future," SAE International Website, Available Online at https://www.sae.org/news/2014/07/testing-audis-new-e-booster-reveals-turbochargings-future, Aug. 4, 2014, 6 pages.

(Continued)

*Primary Examiner* — Binh Q Tran
(74) *Attorney, Agent, or Firm* — Geoffrey Brumbaugh; McCoy Russell LLP

(57) ABSTRACT

Methods and systems are provided for removing moisture from an engine exhaust system. In one example, a method includes, during a vehicle key-off condition, in response to a higher than threshold exhaust moisture level and a lower than threshold engine run time during an immediately prior drive cycle, operating an electric air compressor to remove the moisture accumulated in the exhaust manifold.

20 Claims, 4 Drawing Sheets

(56) References Cited

U.S. PATENT DOCUMENTS

| | | | | |
|---|---|---|---|---|
| 10,054,070 B2* | 8/2018 | Dudar | ................. | F02D 41/0037 |
| 2010/0300068 A1* | 12/2010 | Enomoto | ............ | F02D 41/1494 |
| | | | | 60/273 |
| 2012/0174564 A1* | 7/2012 | Zawacki | ............ | F02D 41/1494 |
| | | | | 60/274 |
| 2014/0100074 A1 | 4/2014 | Glugla | | |
| 2018/0163618 A1* | 6/2018 | Sawai | ................... | B60W 20/50 |

OTHER PUBLICATIONS

Dudar, A., "Systems and Methods for Turbo Wastegate Diagnostics," U.S. Appl. No. 15/831,634, filed Dec. 5, 2017, 89 pages.
Dudar, A., "Systems and Methods for Engine Cooling During S/S Events," U.S. Appl. No. 15/861,428, filed Jan. 3, 2018, 79 pages.

\* cited by examiner

METHODS AND SYSTEMS FOR REMOVING MOISTURE FROM ENGINE EXHAUST SYSTEM

FIELD

The present description relates generally to methods and systems for removing moisture from engine exhaust system.

BACKGROUND/SUMMARY

Condensate accumulated in an engine exhaust during a prolonged vehicle key-off condition may cause erosion and rusting in exhaust system components such as in the tailpipe. For example, moisture from humid air may condense on engine components such as the exhaust passage and form a water puddle locally. Such water puddles may adversely affect operation of exhaust system sensors during subsequent engine operations.

Various approaches are provided for removing condensate from engine components. In one example approach shown in US 20140100074, Glugla et al. disclose a method to increase airflow through a charge air cooler (CAC) in order to purge condensate from the CAC. During an engine non-combusting condition, the transmission system is downshifted to a lower gear to increase engine speed and airflow via the CAC to purge stored condensate to the engine cylinders. By purging the condensate during an engine non-combusting condition, misfire events resulting from ingestion of water may be reduced.

However, the inventors herein have recognized potential disadvantages with the above approach. As one example, the approach may not be able to address condensate accumulated on one or more engine components such as the exhaust system. For example, during conditions when an engine is shutdown, such as during a vehicle key-off condition, or during hybrid vehicle propulsion using motor torque from a system battery, moisture from the ambient air may condense on and accumulate in the engine exhaust manifolds. During a drive cycle, due to engine start/stop conditions, deceleration fuel shut-off events, periods of vehicle propulsion using motor torque, the exhaust temperature may not be high enough to vaporize the moisture accumulated in the exhaust system. The moisture in the exhaust passage may increase the time required for an exhaust oxygen sensor to be functional, thereby causing the engine to operate under open loop control for a longer duration and emissions quality to be adversely affected. Further, freezing of water in the exhaust passage and/or water splashing on an exhaust oxygen sensor may result in inaccurate measurements made by the sensor which may adversely affect determination of air-fuel ratio and level of engine dilution desired during subsequent engine cycles.

The inventors herein have recognized that the issues described above may be addressed by an engine method comprising: responsive to each of a run-time of an engine of a vehicle during a drive cycle being below a threshold duration and a moisture level in either an exhaust system or an intake system of the engine being higher than a threshold level, at a key-off event following the drive cycle, activating an electric air compressor in the intake system to expel moisture from at least the exhaust system. In this way, when moisture accumulated in an engine exhaust system may be not be removed during an engine cycle, an electric air compressor may be operated during an immediately subsequent vehicle-off condition to flow compressed air through the engine exhaust system to remove any accumulated moisture.

As one example, during a vehicle key-off event, ambient humidity may be regularly monitored via on-board vehicle humidity sensors or via a remote server. On-board cameras may be used to monitor condensate formation on the vehicle windshield. Upon a vehicle key-on request, based on the ambient humidity conditions, local weather data, and images of the windshield, moisture formation in the engine exhaust system may be estimated. If the amount of moisture in the exhaust system is higher than a threshold, during the drive cycle, duration of engine operation may be estimated taking into account engine non-combusting conditions including engine start/stop conditions, decleration fuel shut-off event, and periods of vehicle propulsion using motor torque. Exhaust temperature may be monitored during the drive cycle. If the duration of engine operation is lower than a threshold, and/or if the exhaust temperature does not remain above a threshold temperature for a longer than threshold duration, it may be inferred that the exhaust heat may not be sufficient to vaporize the accumulated moisture. The engine may be a boosted engine comprising a turbine driven intake air compressor and an electrically driven intake air compressor (herein also referred to as a battery operated electric air compressor) that is selectively operated for providing additional boost during increased torque demand. During an immediately subsequent vehicle-off condition, the intake throttle may be opened, the exhaust gas recirculation (EGR) valve may be opened, and electric air compressor may be operated to flow compressed air through the engine exhaust system. The increased flow of compressed air through the engine components enables the accumulated moisture to be purged.

In this way, by selectively operating an electric air compressor, moisture accumulated in engine exhaust system may be effectively removed. The technical effect of operating the electric air compressor for moisture removal during a vehicle key-off condition is that by using an existing engine component for drying the engine exhaust system, the need for additional components for condensate removal is eliminated. By removing moisture from the exhaust manifold, heating of oxygen sensors may be expedited and closed loop control of engine fueling may be initiated earlier, improving fuel economy and emissions quality. Overall, by timely purging water accumulated in the engine exhaust system, engine system components may be protected from degradation and exhaust system sensors may be optimally operated during subsequent engine cycles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
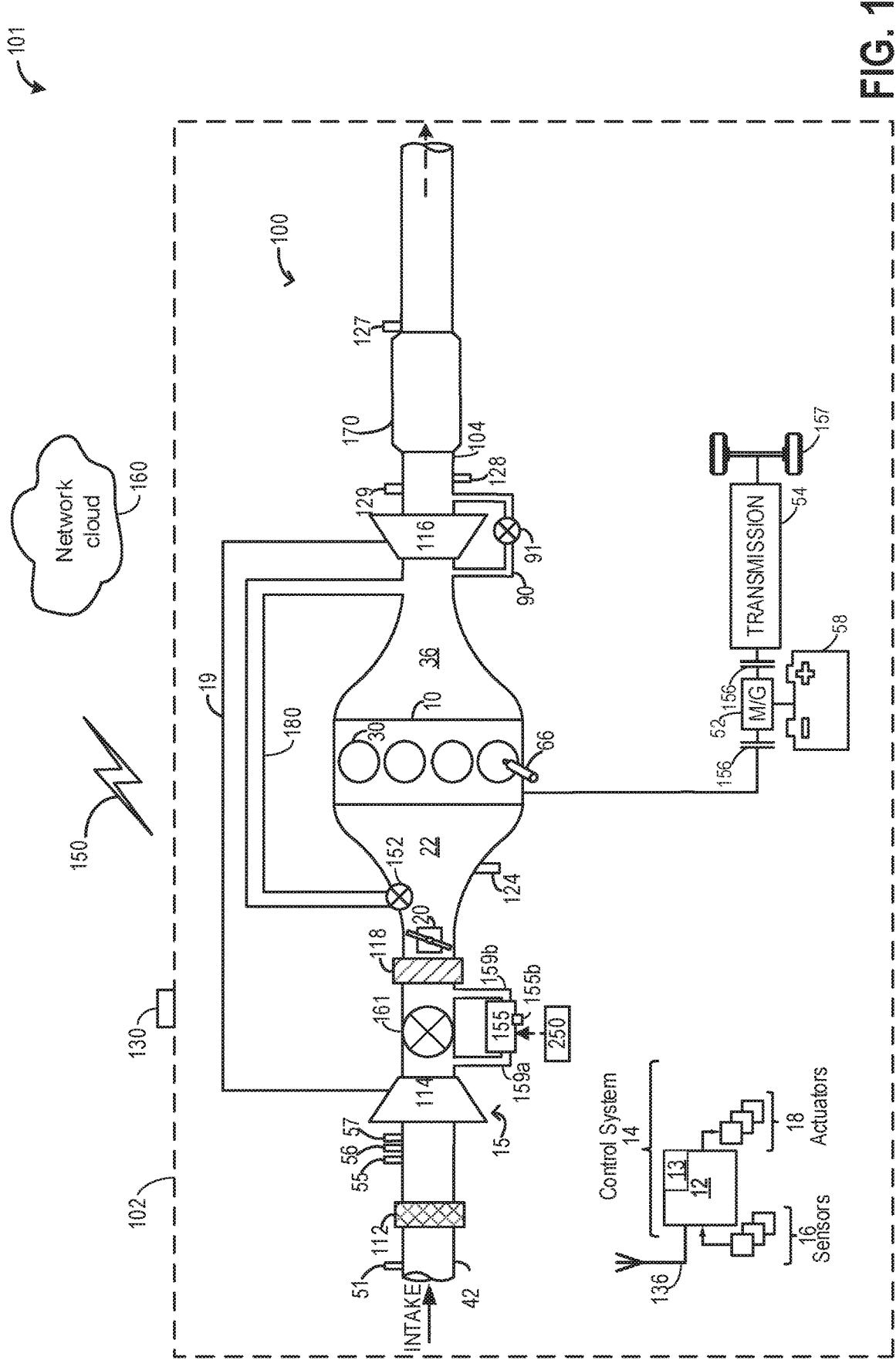
FIG. 1 shows an example engine system including an electric air compressor coupled to a hybrid vehicle.

The following description relates to systems and methods for removing moisture from engine components such as an engine exhaust system. As described with reference to an example engine system coupled to a hybrid vehicle system, as shown in FIG. 1, an electric air compressor may be operated to remove moisture accumulated in the engine components. An engine controller may be configured to perform a control routine, such as the example routine of FIG. 2, to estimate the amount of moisture that has accumulated in the engine exhaust system. The controller may selectively operate the electric air compressor to remove moisture from the engine components during a vehicle key-off event, such as via the control routine of FIG. 3. An example electric air compressor operation that enables the removal of accumulated water is shown in FIG. 4.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 91 may be actuated open to dump at least some exhaust pressure from upstream of the turbine 116 to a location downstream of the turbine 116 via wastegate 90. By reducing exhaust pressure upstream of the turbine, turbine speed can be reduced, which in turn helps to reduce compressor surge.

To assist the turbocharger 15, an additional intake air compressor, herein also referred to as an electric air compressor 155 may be incorporated into the vehicle propulsion system. Electric air compressor 155 may be powered via an onboard energy storage device 250, which may comprise a battery, capacitor, supercapacitor, etc. The electric air compressor may include a compressor driven by an electric motor. A speed of operation of the electric air compressor may include adjusting a speed of operation of the electric motor, the electric motor operated via the on-board energy storage device 250.

In one example, electric air compressor 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric air compressor was not available. In such an example, responsive to the turbocharger spooling up to a threshold speed (e.g. 70,000 rpm), the air compressor 155 may be actuated off, or deactivated. More specifically, operational control of the air compressor 155 may be achieved based on command signals (e.g. duty cycle or pulse width signals) received from the vehicle controller (e.g. controller 12). For example, the controller may send a signal to an electric air compressor actuator 155b, which may actuate on the electric air compressor. In one example the electric air compressor actuator may comprise an electric motor which drives the compression of air.

Electric air compressor 155 may be positioned between a first electric air compressor conduit 159a, and a second electric air compressor conduit 159b. First electric air compressor conduit 159a may fluidically couple intake passage 42 to electric air compressor 155 upstream of electric air compressor bypass valve 161. Second electric air compressor conduit 159b may fluidically couple electric air compressor 155 to intake passage 42 downstream of electric air compressor bypass valve 161. As an example, air may be drawn into electric air compressor 155 via first electric air compressor conduit 159a upstream of electric air compressor bypass valve 161, and compressed air may exit electric air compressor 155 and be routed via second electric air compressor conduit to intake passage 42 downstream of electric air compressor bypass valve 161. In this way, compressed air may be routed to engine intake 22.

In circumstances where the electric air compressor 155 is activated to provide boost more rapidly than if the turbocharger 15 were solely relied upon, it may be understood that electric air compressor bypass valve 161 may be commanded closed while electric air compressor 155 is activated. In this way, intake air may flow through turbocharger 15 and through electric air compressor 155. Once the turbocharger reaches the threshold speed, the electric air compressor 155 may be turned off, and the electric air compressor bypass valve 161 may be commanded open.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor 129, an exhaust flow sensor, and an exhaust pressure sensor may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

During a vehicle key-off event following a drive cycle, the electric air compressor 155 may also be opportunistically operated responsive to each of a lower than threshold engine run-time during the drive cycle and a higher than threshold moisture level in the exhaust manifold 36, to remove the condensate accumulated in the exhaust manifold 36. A moisture level in the engine exhaust manifold 36 may be estimated based on ambient humidity at a location of the vehicle during a previous key-off event and also via on-board cameras 130 configured to determine an amount of moisture on a windshield of the vehicle during the previous key-off event. In one example, the drive cycle may be immediately prior to the key-off event, and a previous key-off event is immediately prior to the drive cycle. The run-time of the engine during the drive cycle may be a function of a number of start-stop events, a duration of each start stop event, a number of deceleration fuel shut-off (DFSO) events, and a duration of each DFSO event during the drive cycle. Expelling the moisture from at least the exhaust system includes routing compressed air from the electric air compressor 155 through the intake system and the exhaust system to remove moisture from each of the intake system and the exhaust system to atmosphere. In order to route the compressed air from the intake system to the exhaust system, each of the throttle 20, the EGR valve 152, and the wastegate valve 91 may be opened. Details of the moisture removal method using the electric air compressor 155 is elaborated at FIGS. 2 and 3.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include MAP sensor 124, exhaust temperature sensor 128, exhaust oxygen sensor 129, compressor inlet temperature sensor 55, compressor inlet pressure sensor 56, ambient humidity sensor 57, IAT sensor 51, engine coolant temperature sensor, and EGR sensor. Other sensors such as additional pressure, temperature, air/fuel ratio, and composition sensors may be coupled to various locations in engine system 100. In addition, sensors coupled to the exterior of the vehicle system such as the rain sensor (windshield sensor) may be used to estimate ambient humidity. One or more cameras 130 may be coupled to the vehicle exterior and/or on the dashboard of the vehicle cabin to capture images of the road ahead of the vehicle. The cameras may also be used to capture images of the windshield.

The actuators 18 may include, for example, electric air compressor bypass valve 161, throttle 20, electric air compressor actuator 155b, EGR valve 152, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, in response to a higher than threshold moisture content in the exhaust manifold 36 as determined based on the input from the ambient humidity sensor 57 and on-board cameras 130, during a vehicle key-off condition, the controller 12 may send a signal to each of the electric air compressor bypass valve 161 to actuate the valve to a closed position, and to the air compressor actuator 155b to actuate the electric air compressor 155 to flow compressed air via each of the intake manifold 22 and exhaust manifold 36 to remove accumulated condensate from the each of the intake manifold 22 and exhaust manifold 36.

The controller 12 may be coupled to a wireless communication device 136 for direct communication of the vehicle 102 with a network cloud 160. Using the wireless communication 150 via the device 136, the vehicle 102 may retrieve data regarding current and/or upcoming ambient conditions (such as ambient humidity, temperature, pressure, etc.) from the network cloud 160. At completion of a drive cycle, the database 13 within the controller 12 may be updated with route information including driver behavioral data, engine operating conditions, date and time information, and traffic information. Furthermore, in some examples, controller may be in communication with a remote engine start receiver (or transceiver) that receives wireless signals from a key fob having a remote start button, the remote start button actuated by a vehicle operator from a location that is remote from the vehicle location. In other examples (not shown), a remote engine start may be initiated via a cellular telephone, or smartphone based system where a user's cellular telephone sends data to a server and the server communicates with the vehicle to start the engine.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 46 to vehicle wheels 157 when one or more clutches 156 are engaged. In the depicted example, a first clutch 156 is provided between crankshaft and electric machine 52, and a second clutch 156 is provided between electric machine 52 and transmission 46. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 157. Electric machine 52 may also be operated as a generator to provide electrical power to charge traction battery 58, for example during a braking operation.

In this way, the components of FIG. 1 enable a system for a hybrid vehicle comprising: a vehicle, including an autonomous vehicle and/or a hybrid vehicle, an electric machine coupled to a battery for propelling the vehicle, an engine including one or more cylinders, an intake manifold, and an exhaust manifold, an intake passage including a compressor, a charge air cooler (CAC) downstream of the compressor, and an intake throttle downstream of the CAC, a conduit coupled to the intake passage downstream of the compressor and upstream of the CAC, the conduit including a motor-driven electric compressor, an electric compressor bypass valve coupled at a junction of the intake passage and the conduit, one or more sensors including each of an ambient humidity sensor coupled to the intake manifold and an exhaust temperature sensor coupled to the exhaust manifold, one or more cameras to capture images of a windshield, an exhaust gas recirculation (EGR) passage coupling the exhaust manifold to the intake manifold, downstream of the compressor, the EGR passage including an EGR valve, and a controller with computer readable instructions stored on non-transitory memory to: estimate moisture level in the exhaust manifold at the end of a drive cycle based on one or more images of the windshield, ambient humidity as estimated via the ambient humidity sensor, a duration of engine operation, and a variation in exhaust temperature during the drive cycle, and in response to a higher than threshold moisture level, during an immediate subsequent vehicle key-off condition, operate the electric compressor to route compressed air through the exhaust manifold to remove moisture from the exhaust manifold.

Figure 2:
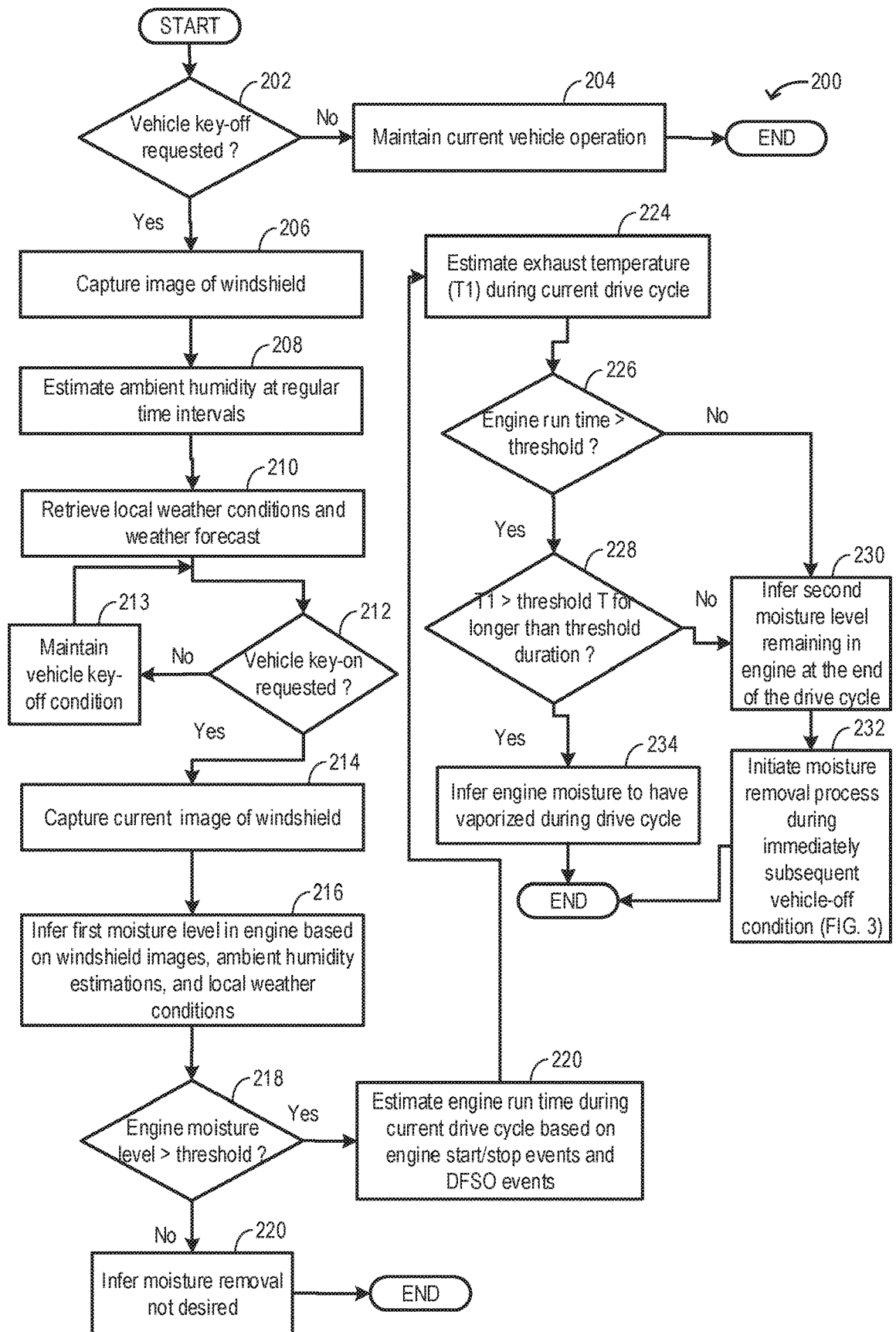
FIG. 2 shows a flow chart illustrating an example method that can be implemented to estimate a level of moisture accumulated in an engine exhaust system.

FIG. 2 shows an example method 200 that can be implemented to estimate a level of moisture accumulated in an engine exhaust system. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes determining if a vehicle key-off is requested. During a vehicle key-off condition, the vehicle is not propelled using engine torque and/or motor torque and the vehicle may remain in a stationary position. During a vehicle key-off condition, the transmission gear may be in a park position. In one example, key-off may be requested by application of a brake pedal by the vehicle operator.

If it is determined that a vehicle key-off condition is not being requested, at 204, current vehicle operation may be maintained and an electric air compressor (such as electric air compressor 155 in FIG. 1) may be operated as required to provide boost assist during an increased torque demand. The electric air compressor may be coupled to a conduit parallel to an intake passage, the conduit coupled to the intake passage downstream of an intake compressor and upstream of a charge air cooler. During conditions when the boost pressure provided by operating the turbocharger (such as intake compressor 114 and exhaust turbine 116 in FIG. 1) is lower than a desired boost pressure, the electric air compressor may be operated using energy from an onboard energy storage device (such as energy storage device 250 in FIG. 1) to provide the desired boost. The speed and duration of operation of the electric air compressor may be adjusted based on turbocharger speed, and torque demand as estimated via a pedal position sensor. In one example, the speed and duration of operation of the electric air compressor may be increased with an increase in the torque demand and a decrease in turbocharger speed. In another example, the speed and duration of operation of the electric air compressor may be decreased with a decrease in the torque demand and an increase in turbocharger speed.

If it is determined that a vehicle key-off has been requested, at 206, immediately after the vehicle comes to rest, a first image of the windshield (from within the vehicle)

may be captured via one or more on-board cameras (such as camera 130 in FIG. 1) and the first image may be stored in the controller memory (database). Since the vehicle has been in motion, even if there has been precipitations, the wiper would have removed any moisture from the windscreen. Therefore, the image captured immediately after vehicle stop may show a clean windscreen (without presence of condensate).

At 208, ambient humidity conditions may be monitored at regular intervals throughout the duration of the vehicle key-off condition, and stored in the database. Ambient humidity may be measured via one or more of an intake humidity sensor (such as humidity sensor 57 in FIG. 1) and a windshield humidity sensor. In one example, ambient humidity may be measured at a 30 minute interval during the vehicle-off period. If the vehicle is parked overnight, there may be substantial (such as more than 10%) change in humidity over the duration of the night. Along with ambient humidity, the controller may also record ambient temperature via the intake air temperature sensor at regular intervals throughout the vehicle key-off condition. Humid air may be trapped inside the engine intake manifold and engine exhaust manifold at engine shut-down. The amount of air trapped may be a function of the throttle opening. As the engine cools down, water from the trapped air may condense on the engine components.

At 210, local weather conditions including ambient humidity and ambient temperature may be retrieved from an external network (such as network cloud 160 in FIG. 1) communicatively coupled to the vehicle via wireless communication (such as wireless communication 150 in FIG. 1). A dew point temperature for the current location may be obtained for the vehicle location. Ambient moisture may condense on engine components if the ambient temperature falls below the dew point temperature. Weather forecast for the current location may also be obtained from the external network and stored in a database. The current location of the vehicle may be obtained using a global positioning service.

At 212, the routine includes determining if a vehicle key-on request has been made. A key-on request may include an operator using a key to initiate vehicle operation. For a remote start, a vehicle key-on signal may be received from a source external to the vehicle. In one example, the operator may remotely request an engine start such that vehicle cabin heating may be initiated and the cabin reaches a desired temperature before the operator enters the cabin and starts driving the vehicle. In another example, such as where the vehicle has at least some autonomous functionality, in response to a request for a remote vehicle start, the electric machine may be operated to attain the desired cabin temperature and then the vehicle may be propelled using machine torque and/or engine torque. In yet another example, an operator of an autonomous vehicle may initiate vehicle operation (propulsion) from a remote location using wireless communication. The vehicle may be communicatively coupled to an external source such as a key fob, a cellular phone, or a smart phone used for remote engine start via wireless communication. Based on the signal received from the remote source, the controller may schedule the engine start at a requested time.

If it is determined that a vehicle key-on is not requested, at 213, the vehicle key-off condition may be maintained and current humidity conditions may be monitored. If it is determined that a vehicle key-on request has been made, at 214, at the onset of a drive cycle, a second image of the windshield may be captured via the on-board cameras. During the vehicle key-off condition, ambient moisture may condense on the windshield forming a layer of moisture on the surface of the windshield. In one example, at vehicle key-on, the wiper blades may be activated to wipe the windshield once to remove any moisture accumulated. A third image of the windshield may be captured via the on-board cameras after wiping the windshield.

At 216, a first moisture level in engine components including the intake manifold and the exhaust manifold may be estimated based on each of the windshield images, the ambient humidity estimations made throughout the duration of the vehicle key-off condition, and the local weather conditions during the vehicle key-off condition. The controller may retrieve the ambient humidity values and the ambient temperature values as recorded throughout the vehicle-off condition, and the local weather conditions including dew point temperature as obtained from the external network as stored in the database. In one example, the controller may estimate a first level of moisture in the engine components as a function of each of the ambient humidity values, the ambient temperature values, and the dew point temperatures. In another example, the controller may use a lookup table to determine the first moisture level in the engine components, the inputs being each of the ambient humidity values, the ambient temperature values, and the dew point temperatures, and the output being the moisture level in the engine components. In one example, the threshold is a non-zero threshold wherein the threshold humidity corresponds to a humidity level above which moisture from air may condense and accumulate on engine components. In another example, the threshold relative humidity level is 50%.

In one example, the controller may carry out image analysis on each of the first windshield image, the second windshield image, and the third windshield image. If during the vehicle key-off condition, the ambient temperature decreases below the dew point temperature and the ambient humidity increases to higher than the threshold humidity, condensate may form on the windshield. During image analysis, the controller may subtract the first image from the second image to determine if a layer of moisture (manifested as fuzziness on the windshield) is present on the windshield. If it is observed from the third image that the windshield may be cleared by operating the wiper, it may be inferred that the accumulation on the windshield is caused by moisture. The controller may use image analysis techniques to infer the quantity of moisture accumulated on the windshield. The first moisture level in the engine components may be directly proportional to the quantity of moisture accumulated on the windshield. If it is observed from the third image that the windshield does not become clear up after wiping, it may be inferred that a material other than moisture (such as dust, ash etc.) has accumulated on the windshield.

In this way, at the onset of a drive cycle, a first moisture level may be estimated based on one or more of an amount of moisture accumulated on a windshield of the vehicle during an immediately previous vehicle key-off condition, a variation in ambient humidity during the immediately previous vehicle key-off condition, and a dew point temperature at a location of the vehicle during the immediately previous vehicle key-off condition.

At 218, the routine includes determining if the moisture level accumulated on engine components including the engine intake manifold and the exhaust manifold is higher than a first threshold moisture level. In one example, the first threshold moisture level may be a non-zero, positive, moisture level above which the accumulated moisture may disrupt operation of engine sensors such as the exhaust oxygen sensor. The controller may calibrate the first threshold moisture level based on operation of one or more engine sensors. In one example, the threshold moisture level may be 75% relative humidity.

If it is determined that the moisture level accumulated on engine components including the engine intake manifold and the exhaust manifold is lower than the threshold moisture level, it may be inferred that the moisture may not have any detrimental effect on the engine components including the sensors and/or on the engine hardware. Therefore, at 220, it may be inferred that a moisture removal process may not be desired.

If it is determined that the moisture level accumulated on engine components including the engine intake manifold and the exhaust manifold is higher than the threshold moisture level, if the moisture does not vaporize during the drive cycle, moisture removal may be desired. At 220, an engine run time may be estimated as a function of each of a number of start-stop (idle-stop) events, a duration of each start-stop event, a number of deceleration fuel shut-off (DFSO) events, a duration of each DFSO event, and a duration of vehicle operation using motor torque during the drive cycle. Engine run time may include the total amount of time during which the engine was combusting fuel and air. In one example, the engine run time may decrease with an increase in each of the number of start-stop events, the duration of each start-stop event, the number of DFSO events, and duration of each DFSO event during the drive cycle, and the duration of vehicle operation using motor torque during the drive cycle. In another example, the engine run time may increase with a decrease in each of the number of start-stop events, the duration of each start-stop event, the number of DFSO events, the duration of each DFSO event during the drive cycle, and the duration of vehicle operation using motor torque during the drive cycle.

At 224, exhaust temperature (T1) may be estimated via an exhaust temperature sensor (such as temperature sensor 128 in FIG. 1) during the drive cycle. In one example, T1 may be monitored at regular intervals (such as at intervals of 2 minutes). At 226, the routine includes determining if the engine runtime during the drive cycle is higher than a threshold run time. The threshold run time may correspond to a run time above which the heat generated from combustion may be sufficient to vaporize the moisture accumulated on the engine components including the exhaust manifold. The threshold run time may be calibrated as a function of the moisture level accumulated on engine components. In one example, the controller may use a look-up table for determining the threshold engine run time, with the input being the moisture level accumulated on engine components and the output being the threshold engine run time. As an example, the threshold run time may be increased with an increase in the moisture level accumulated on engine components.

If it is determined that the engine run time is higher than the threshold run time, at 228, the routine includes determining if the exhaust temperature (T1) has remained above a threshold temperature (T) for over a threshold duration. The threshold temperature (T) may correspond to the temperature above which moisture may evaporate from the exhaust system. The controller may calibrate the threshold temperature based on the boiling point of water. In one example, the threshold temperature may be 100° C. The threshold duration may correspond to the time desired for vaporizing the entire volume of moisture accumulated on the engine components. In one example, the controller may use a look-up table for determining the threshold duration, with the input being the moisture level accumulated on engine components and the output being the threshold duration. As an example, the threshold duration may be increased with an increase in the moisture level accumulated on engine components.

If it is determined that even if the engine run time is higher than the threshold run time, the exhaust temperature does not remain above the threshold temperature for over the threshold duration, it may be inferred that sufficient exhaust heat may not be available during the drive cycle to remove the entire amount of moisture accumulated on the engine components. If at 228, it is determined that the engine run time is lower than the threshold run time, it may be inferred that irrespective of exhaust temperature, sufficient time may not be available during the drive cycle to remove the entire amount of moisture accumulated on the engine components, and the routine may directly proceed to step 230.

At 230, a second moisture level in the engine including the intake manifold and the exhaust manifold may be estimated by the controller as a function of each of the first moisture level, the duration of operation of the engine (engine run time) during the drive cycle, and the temperature of the exhaust manifold during the drive cycle. The second moisture level may be directly proportional to the first moisture level. In one example, the second moisture level may increase with an increase in the first moisture level and a decrease in each of the duration of operation of the engine and the exhaust temperature. In another example, the second moisture level may decrease with a decrease in the first moisture level and an increase in each of the duration of operation of the engine and the exhaust temperature.

At 232, a moisture removal process may be initiated during the immediately subsequent vehicle-off condition to remove the moisture remaining (second moisture level) on the engine components. Details of the moisture removal procedure is described with reference to FIG. 3. In one example, the moisture removal process may be carried out only if the second moisture level is above a second threshold level. In one example, the second threshold moisture level may be a non-zero, positive, moisture level above which the accumulated moisture may cause damage to the engine hardware, over time. In one example, the second threshold moisture level may be 50% relative humidity.

If it is determined that the engine run time is higher than the threshold run time and the exhaust temperature remains above the threshold temperature for over the threshold duration, at 234, it may be inferred that the moisture accumulated on the engine has vaporized and further moisture removal may not be desired.

Figure 3:
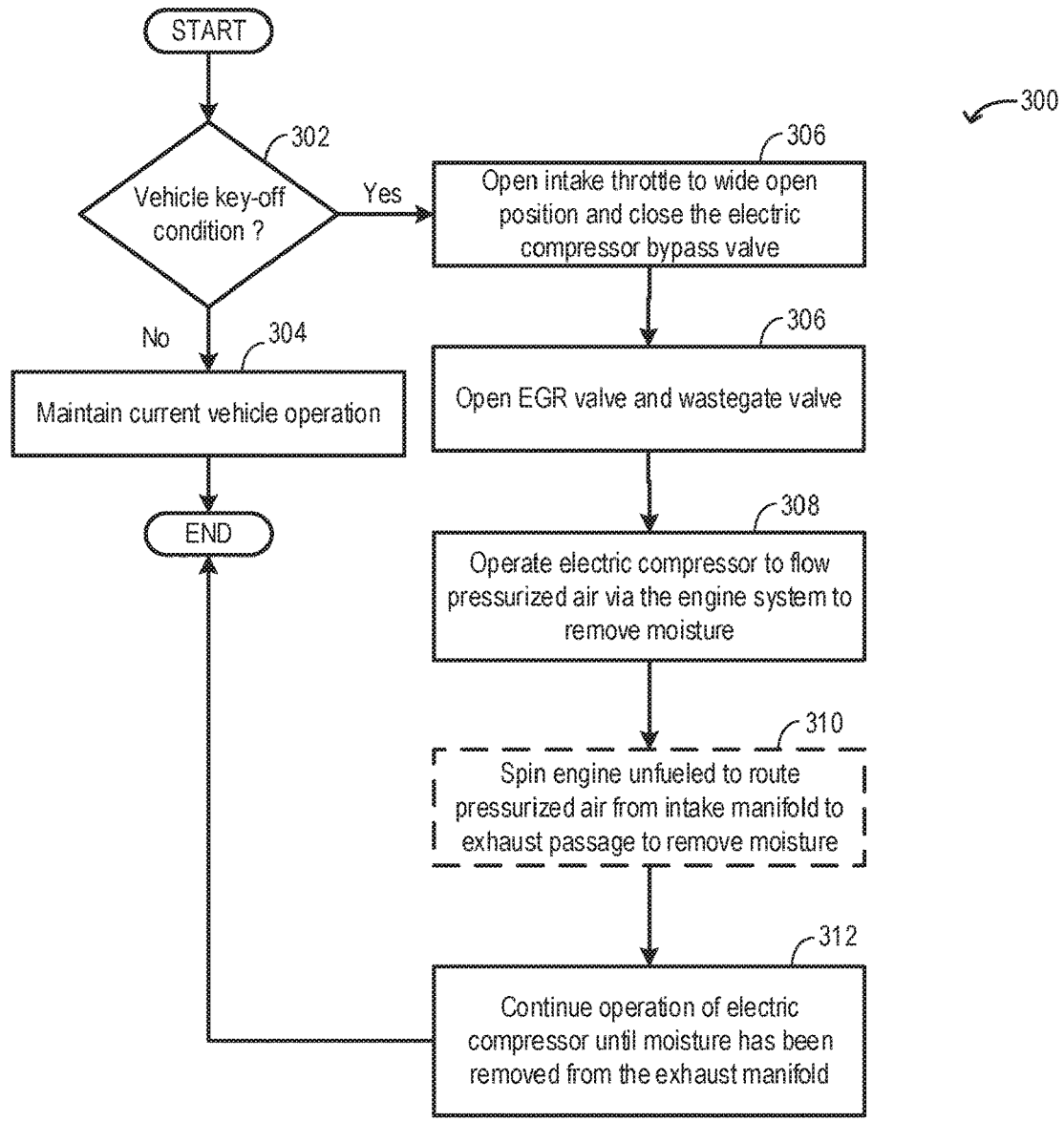
FIG. 3 shows a flow chart illustrating an example method that can be implemented to remove moisture accumulated in the engine exhaust system.
Figure 4:
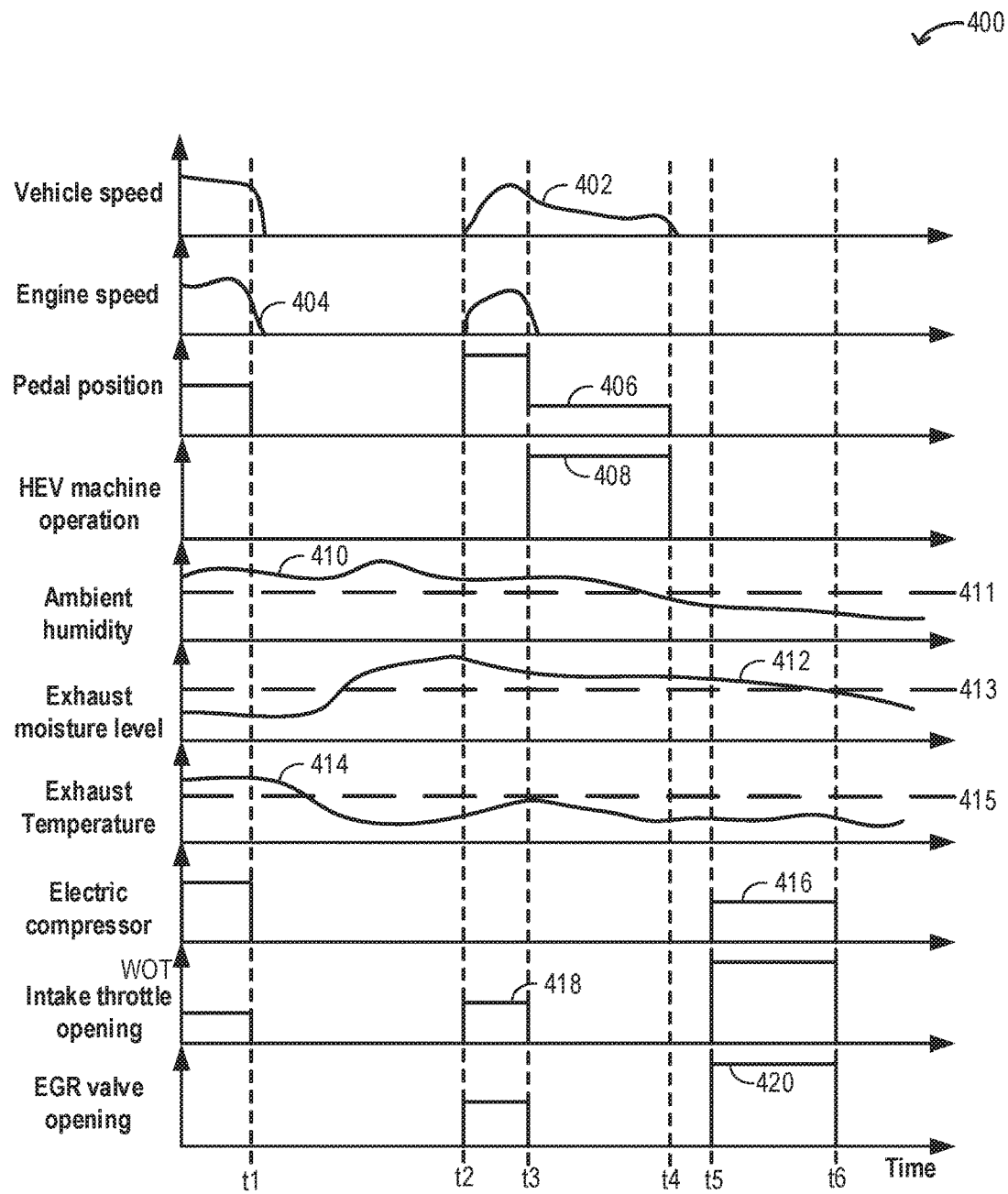
FIG. 4 shows an example operation of the electric air compressor for moisture removal from the engine exhaust system, according to the present disclosure.

FIG. 3 shows an example method 300 that can be implemented to remove moisture accumulated in the engine exhaust system. The method 300 may be a part of method 200 as described in FIG. 2 and may be carried out at in step 232 of method 200.

At 302, the routine includes determining if the vehicle is in a key-off condition. The key-off condition may be immediately subsequent to the drive cycle during which method 200 of FIG. 2 may be carried out. During a vehicle key-off condition, the vehicle may be stationary, and may not be propelled using engine torque and/or machine torque. If it is determined that the vehicle is not in a key-off condition, at 304, current vehicle operation may be maintained. Current vehicle operation may include, the vehicle being propelled using engine torque and/or machine torque.

If it is determined that the vehicle is in a key-off condition, the moisture removal process from the engine components may be initiated. At 306, the controller may send a signal to an actuator coupled to the intake throttle (such as intake throttle 20 in FIG. 1) to open the throttle to a wide open position to allow ambient air to enter the engine intake manifold which may be pressurized and routed through the engine intake manifold and engine exhaust manifold to remove any accumulated moisture. The controller may also send a signal to an actuator coupled to an electric air compressor bypass valve (such as bypass valve 161 in FIG. 1) to actuate the bypass valve to a completely closed position. By closing the electric air compressor bypass valve, the entire volume of air entering the intake passage via the throttle may flow to the intake manifold via the electric booster.

At 306, an exhaust gas recirculation (EGR) valve (such as EGR valve 152 in FIG. 1) coupled to an EGR passage (such as EGR passage 180 in FIG. 1) may be actuated to a completely open position by the controller to route the compressed air from the intake manifold to the exhaust passage via the EGR passage. Since the engine is not rotating, the engine valves may not be open to allow compressed air to flow through the engine cylinders. Also, the controller may send a signal to a wastegate valve (such as wastegate valve 91 in FIG. 1) coupled to a wastegate passage to actuate the valve to a completely open position. Relative to the exhaust turbine, the wastegate passage provides a lower resistance path for the compressed air to flow from the intake manifold to the exhaust manifold.

At 308, the electric air compressor may be operated to flow pressurized air via the intake manifold and exhaust manifold to remove moisture. The controller may send a signal to the electric air compressor actuator (such as actuator 155b in FIG. 1) to actuate the electric air compressor using energy from the energy storage device coupled to the electric booster. As the ambient air entering the intake manifold via the wide open throttle flows through the electric air compressor, the air is pressurized (compressed) and the temperature of the air may increase. As the compressed air at an elevated temperature flows via the intake manifold, the moisture condensed in the intake manifold may vaporize. The water vapor and the remaining moisture may then be removed from the intake manifold with the pressurized air stream. The pressurized air may also remove any condensate accumulated in a charge air cooler (CAC) coupled to the intake manifold downstream of the electric air compressor. The compressed air may then be routed to the engine exhaust manifold via the EGR passage and the wastegate passage. As the compressed air flows through the exhaust passage, the moisture accumulated in the exhaust system may be flushed out to the atmosphere via the tailpipe.

In one example, as an optional step, at 310, the routine may include spinning the engine unfueled via an electric machine (such as electric machine 52 in FIG. 1) using motor torque. The controller may send a signal to the actuator of the electric motor to start spinning the engine at an idling speed, such as at or around 400 rpm. Due to the lower pressure created from spinning the engine, the pressurized air from the intake manifold may be routed to the exhaust passage via the engine cylinders. The air may enter the engine cylinders via respective intake valves and exit the cylinders via respective exhaust valves. As the pressurized air having an elevated temperature flows through the engine cylinders, any moisture trapped within the engine cylinders may be vaporized and removed along with the air stream, thereby drying the cylinders. After flowing through the exhaust system, the pressurized air along with the accumulated moisture may be routed to the atmosphere via the tailpipe.

At 312, operation of the electric air compressor may be continued until the moisture has been removed from the engine exhaust manifold. In one example, the duration of operation of the electric air compressor may be directly proportional to the difference between the second moisture level remaining in the exhaust manifold (as estimated in step 230 of method 200) and the second threshold moisture level (as defined in step 232 of method 200). In one example, the duration of operation of the electric air compressor may increase with an increase in the difference. The controller may use a lookup table to estimate the duration of operation of the electric air compressor, with the input being the difference between the second moisture level and the second threshold moisture level.

FIG. 4 shows an example timeline 400 illustrating operation of an electric air compressor to remove water accumulated in engine components. The horizontal (x-axis) denotes time and the vertical markers t1-t6 identify significant times in the routine for operation of the electric air compressor.

The first plot, line 402, shows variation in vehicle speed over time. The second plot, line 404, shows engine speed. The third plot, line 406, shows a position of an accelerator pedal which is representative of driver torque demand. The fourth plot, line 408, shows operation of the electric machine coupled to the HEV. The machine may be operated to provide motor torque to propel the HEV. The fifth plot, line 410, shows ambient humidity as estimated based on input from an ambient humidity sensor coupled to the engine intake manifold. Dashed line 411 shows a threshold humidity above which water from air may condense on engine components including the exhaust manifold. The controller may calibrate the threshold humidity level based on a dew point temperature at the location of the vehicle. The sixth plot, line 412, shows a level (amount) of moisture accumulated in the engine exhaust system (including exhaust manifold and exhaust passage). The exhaust moisture level is estimated by the controller based on ambient humidity, local weather conditions (as retrieved from an external server via wireless communication, and dew formation on the windshield as inferred based on images of the windshield captured via on-board cameras). Dashed line 412 shows a threshold exhaust moisture level above which functionality of the exhaust oxygen sensor may be adversely affected. The controller may calibrate the threshold exhaust moisture level based on operation of the oxygen sensor. The seventh plot, line 414, shows variation in exhaust temperature over time. Dashed line 415 shows a threshold exhaust temperature above which moisture accumulated in the exhaust system may vaporize. The controller may calibrate the threshold exhaust temperature based on the boiling point of water and the moisture level in the exhaust system. The eighth plot, line 416, shows a speed of operation of an electric air compressor (such as electric air compressor 155 in FIG. 1) coupled to a conduit parallel to the intake manifold downstream of an intake compressor and upstream of a charge air cooler (CAC). The ninth plot, line 416, shows opening of an intake throttle. The tenth plot, line 420, shows opening of an exhaust gas recirculation (EGR) valve coupled to an EGR passage, one end of the EGR passage coupled to the intake passage downstream of each of the electric air compressor and the CAC, and the other end of the EGR passage coupled to the exhaust passage upstream of an exhaust turbine.

Prior to time t1, the vehicle is being propelled using engine torque and the HEV machine is not being operated.

The throttle position is directly proportional to the torque demand which is in turn is based on the pedal position. In order to provide the requested boost pressure, the electric air compressor is operated. Based on the engine dilution demand, EGR is not requested during this time and the EGR valve is maintained in a closed position. Even as the ambient humidity is higher than the threshold humidity 411, since the exhaust temperature is higher than the threshold temperature 415, the exhaust moisture level remains below the threshold level 413.

At time t1, in response to a tip out and a vehicle-off request, the vehicle speed reduces to zero and also the engine speed reduces to zero. Between time t1 and t2, during the vehicle key-off condition, the ambient humidity is recorded. As the exhaust temperature reduces to below the threshold temperature 415 and the ambient humidity is higher than the threshold humidity 411, it is inferred that the exhaust moisture level increases to above the threshold level 413.

At time t2, in response to a vehicle start request, the engine is started. Between time t2 and t3, the EGR valve is opened to supply EGR based on engine dilution demands. Between t2 and t3, as combustion continues, exhaust temperature increases causing a portion of the moisture accumulated in the exhaust manifold to vaporize. However, the engine run time, between time t2 and t3 is not long enough to remove sufficient moisture from the exhaust system and the exhaust moisture level remains above the threshold level 413. At time t3, in response to a change in pedal position, a decrease in torque demand is inferred. Between time t3 and t4, the engine is not rotated and the demanded torque is supplied by operating the electric machine. Since combustion is discontinued, exhaust heat is no longer available for evaporation of the moisture accumulated in the exhaust system.

At time t4, in response to a tip out and a vehicle-off request, the vehicle speed reduces to zero and the HEV machine is no longer operated. At the vehicle key-off it is inferred that the exhaust moisture level continues to remain above the threshold level 413. Based on the higher than threshold moisture level 413, it is inferred that the moisture remaining in the exhaust system may cause corrosion to some of the exhaust system components and may adversely affect operation of the exhaust oxygen sensor during the immediately subsequent engine operation. Therefore, after the vehicle key-off, removal process of the exhaust moisture is initiated (at time t5). At time t4, it is observed that the ambient humidity at the current location of the vehicle is lower than threshold humidity 411, thereby reducing the possibility of further moisture condensation on the vehicle components.

At time t5, the intake throttle opening is increased to a wide open position and the controller sends a signal to the electric air compressor actuator to activate the electric compressor. The speed of operation of the electric compressor for moisture removal is higher than the speed of operation of the electric compressor prior to time t1 (to provide desired boost pressure). The air compressed by the electric booster is routed through the intake manifold to remove any accumulated moisture. The EGR valve is actuated to a fully open position to allow the compressed air to flow from the intake manifold to the exhaust manifold via the EGR passage. Between time t5 and t6, compressed air flows through each of the intake manifold, the EGR passage, and the exhaust manifold, removing moisture from the exhaust system. At time t6, based on the exhaust moisture level at time t5 and the duration of operation of the electric compressor, it is inferred that the compressed air flowing through the exhaust system has been able to remove sufficient moisture from the exhaust system and that the exhaust moisture level has reduced to below the threshold 413. Therefore, at time t6, the controller sends a signal to the actuator coupled to the electric air compressor to suspend operation of the electric air compressor and the vehicle key-off condition is continued.

In this way, by operating the electric air compressor during an engine key-off condition, moisture accumulated in the engine intake manifold and the exhaust manifold may be removed, thereby reducing engine cranking time and improving driving experience. By removing water from the exhaust manifold prior to an engine start, heating of oxygen sensors may be expedited and water splashing on the oxygens sensors may be reduced, thereby improving accuracy of measurements and emissions quality. The technical effect of opportunistically using the electric booster to dry the exhaust system is that the possibility of damage to exhaust system components due to corrosion and rust formation may be reduced. Overall, by drying the intake manifold and the exhaust manifold, combustion stability may be increased, and emissions quality may be improved during an immediately subsequent engine combusting condition.

An example engine method comprises: responsive to each of a run-time of an engine of a vehicle during a drive cycle being below a threshold duration and a moisture level in either an exhaust system or an intake system of the engine being higher than a threshold level, at a key-off event following the drive cycle activating an electric air compressor in the intake system to expel moisture from at least the exhaust system. In any preceding example, additionally or optionally, activating the electric air compressor is further based on a lower than threshold exhaust temperature during the drive cycle. In any or all of the preceding examples, additionally or optionally, the moisture level is estimated via on-board cameras configured to determine an amount of moisture on a windshield of the vehicle during a previous key-off event. In any or all of the preceding examples, additionally or optionally, the drive cycle is immediately prior to the key-off event, and the previous key-off event is immediately prior to the drive cycle. In any or all of the preceding examples, additionally or optionally, the moisture level is further estimated as a function of ambient humidity at a location of the vehicle during the previous key-off event. In any or all of the preceding examples, additionally or optionally, the run-time of the engine is a function of a number of start-stop events, a duration of each start stop event, a number of deceleration fuel shut-off (DFSO) events, and a duration of each DFSO event during the drive cycle. In any or all of the preceding examples, additionally or optionally, expelling the moisture from at least the exhaust system includes routing compressed air from the electric air compressor through the intake system and the exhaust system to remove moisture from each of the intake system and the exhaust system to atmosphere. In any or all of the preceding examples, additionally or optionally, the electric air compressor is coupled to a conduit parallel to an intake passage, the conduit coupled to the intake passage downstream of an intake compressor and upstream of a charge air cooler, the method further comprising closing an electric air compressor bypass valve coupled to the intake passage, downstream of the intake compressor, to direct ambient air into the conduit. In any or all of the preceding examples, additionally or optionally, the engine includes an exhaust gas recirculation passage coupling the exhaust system to the intake system, downstream of the electric air compressor, and wherein routing the compressed air through the intake system and the exhaust system further includes opening an exhaust gas recirculation (EGR) valve coupled to the exhaust gas recirculation passage to flow compressed air exiting the electric air compressor to the exhaust system. In any or all of the preceding examples, the method further comprises, additionally or optionally, while opening the EGR valve, actuating an intake throttle coupled to the intake passage downstream of the charge air cooler to a wide open position, and actuating a wastegate valve positioned in a wastegate passage which is coupled in parallel to a turbine positioned in an exhaust system, to route compressed air from the electric air compressor into the exhaust system. In any or all of the preceding examples, additionally or optionally, the ambient humidity is measured via one or more of an intake humidity sensor, a windshield humidity sensor, or inferred based on weather data including ambient humidity conditions retrieved from an external network communicatively coupled to the vehicle via wireless communication.

Another engine example method comprises: at an onset of a drive cycle of a vehicle, estimating a first moisture level in an exhaust system of an engine, at a completion of the drive cycle, estimating a second moisture level in the exhaust system based on the first moisture level, and during an immediately subsequent vehicle key-off condition, responsive to the second moisture level being higher than a threshold level, routing compressed air from an engine intake manifold through the exhaust system. In any preceding example, additionally or optionally, the first moisture level is estimated based on one or more of an amount of moisture accumulated on a windshield of the vehicle during an immediately previous vehicle key-off condition, a variation in ambient humidity during the immediately previous vehicle key-off condition, and a dew point temperature at a location of the vehicle during the immediately previous vehicle key-off condition. In any or all of the preceding examples, additionally or optionally, the second moisture level is further based on a duration of operation of the engine during the drive cycle and a temperature of the exhaust manifold during the drive cycle. In any or all of the preceding examples, additionally or optionally, routing compressed air includes operating an electric air compressor coupled to the engine intake manifold to flow compressed air from the intake manifold to the exhaust system. In any or all of the preceding examples, additionally or optionally, routing compressed air further includes opening a throttle coupled to the intake manifold, opening an exhaust gas recirculation (EGR) valve housed in an EGR passage coupling the intake manifold to an exhaust manifold of the exhaust system, and opening a wastegate valve housed in a wastegate passage coupled to the exhaust manifold across a turbine. In any or all of the preceding examples, additionally or optionally, operating the electric air compressor includes operating the electric air compressor for a duration based on a difference between the second moisture level and the threshold level, the duration increased with an increase in the difference.

In yet another example, a system comprises: a vehicle, including an autonomous vehicle and/or a hybrid vehicle, an electric machine coupled to a battery for propelling the vehicle, an engine including one or more cylinders, an intake manifold, and an exhaust manifold, an intake passage including a compressor, a charge air cooler (CAC) downstream of the compressor, and an intake throttle downstream of the CAC, a conduit coupled to the intake passage downstream of the compressor and upstream of the CAC, the conduit including a motor-driven electric compressor, an electric compressor bypass valve coupled at a junction of the intake passage and the conduit, one or more sensors including each of an ambient humidity sensor coupled to the intake manifold and an exhaust temperature sensor coupled to the exhaust manifold, one or more cameras to capture images of a windshield, an exhaust gas recirculation (EGR) passage coupling the exhaust manifold to the intake manifold, downstream of the compressor, the EGR passage including an EGR valve, and a controller with computer readable instructions stored on non-transitory memory to: estimate moisture level in the exhaust manifold at the end of a drive cycle based on one or more images of the windshield, ambient humidity as estimated via the ambient humidity sensor, a duration of engine operation, and a variation in exhaust temperature during the drive cycle, and in response to a higher than threshold moisture level, during an immediate subsequent vehicle key-off condition, operate the electric compressor to route compressed air through the exhaust manifold to remove moisture from the exhaust manifold. In any preceding example, additionally or optionally, the one or more images of the windshield are captured during a vehicle key-off event immediately prior to the drive cycle and wherein the ambient humidity is monitored over a duration of the vehicle key-off event immediately prior to the drive cycle. In any or all of the preceding examples, additionally or optionally, the duration of engine operation is estimated based on each of a duration and frequency of one or more of engine start-stop events and deceleration fuel shut-off events.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
estimating a moisture level in at least one of an exhaust system and an intake system based on input from one or more of on-board cameras and a humidity sensor, and, responsive to each of a run-time of an engine of a vehicle during a drive cycle being below a threshold duration and the moisture level in one of the exhaust system and the intake system being higher than a threshold level, at a key-off event following the drive cycle, activating, via an electronic controller, an electric air compressor in the intake system to expel moisture from at least the exhaust system.

2. The method of claim 1, wherein activating the electric air compressor is further based on a lower than threshold exhaust temperature during the drive cycle.

3. The method of claim 1, wherein the moisture level is estimated via on-board cameras configured to determine an amount of moisture on a windshield of the vehicle during a previous key-off event.

4. The method of claim 3, wherein the drive cycle is immediately prior to the key-off event, and the previous key-off event is immediately prior to the drive cycle.

5. The method of claim 3, wherein the moisture level is further estimated as a function of ambient humidity at a location of the vehicle during the previous key-off event.

6. The method of claim 1, wherein the run-time of the engine is a function of a number of start-stop events, a duration of each start-stop event, a number of deceleration fuel shut-off (DFSO) events, and a duration of each DFSO event during the drive cycle.

7. The method of claim 1, wherein expelling the moisture from at least the exhaust system includes routing compressed air from the electric air compressor through the intake system and the exhaust system to remove moisture from each of the intake system and the exhaust system to atmosphere.

8. The method of claim 1, wherein the electric air compressor is coupled to a conduit parallel to an intake passage, the conduit coupled to the intake passage downstream of an intake compressor and upstream of a charge air cooler, the method further comprising closing an electric air compressor bypass valve coupled to the intake passage, downstream of the intake compressor, to direct ambient air into the conduit.

9. The method of claim 1, wherein the engine includes an exhaust gas recirculation passage coupling the exhaust system to the intake system, downstream of the electric air compressor, and wherein routing the compressed air through the intake system and the exhaust system further includes opening an exhaust gas recirculation (EGR) valve coupled to the exhaust gas recirculation passage to flow compressed air exiting the electric air compressor to the exhaust system.

10. The method of claim 9, further comprising, while opening the EGR valve, actuating an intake throttle coupled to an intake passage downstream of a charge air cooler to a wide open position, and actuating a wastegate valve positioned in a wastegate passage which is coupled in parallel to a turbine positioned in the exhaust system, to route compressed air from the electric air compressor into the exhaust system.

11. The method of claim 5, wherein the ambient humidity is measured via one or more of an intake humidity sensor, a windshield humidity sensor, or inferred based on weather data including ambient humidity conditions retrieved from an external network communicatively coupled to the vehicle via wireless communication.

12. A method, comprising:
at an onset of a drive cycle of a vehicle, estimating a first moisture level in an exhaust system of an engine;
at a completion of the drive cycle, estimating a second moisture level in the exhaust system based on the first moisture level; and
during an immediately subsequent vehicle key-off condition, responsive to the second moisture level being higher than a threshold level, activating, via an electronic controller, an air compressor to route compressed air from an engine intake manifold through the exhaust system,
wherein the first moisture level is estimated based on one or more of an amount of moisture accumulated on a windshield of the vehicle during an immediately previous vehicle key-off condition, a variation in ambient humidity during the immediately previous vehicle key-off condition, and a dew point temperature at a location of the vehicle during the immediately previous vehicle key-off condition.

13. The method of claim 12, wherein the second moisture level is further based on a duration of operation of the engine during the drive cycle and a temperature of an exhaust manifold during the drive cycle.

14. The method of claim 12, wherein the activating the air compressor includes operating an electric air compressor coupled to the engine intake manifold to flow compressed air from the engine intake manifold to the exhaust system.

15. The method of claim 12, wherein routing compressed air further includes opening a throttle coupled to the engine intake manifold, opening an exhaust gas recirculation (EGR) valve housed in an EGR passage coupling the engine intake manifold to an exhaust manifold of the exhaust system, and opening a wastegate valve housed in a wastegate passage coupled to the exhaust manifold across a turbine.

16. The method of claim 14, wherein operating the electric air compressor includes operating the electric air compressor for a duration based on a difference between the second moisture level and the threshold level, the duration increased with an increase in the difference.

17. A system, comprising:
a vehicle, including an autonomous vehicle and/or a hybrid vehicle;
an electric machine coupled to a battery for propelling the vehicle;
an engine including one or more cylinders, an intake manifold, and an exhaust manifold;
an intake passage including a compressor, a charge air cooler (CAC) downstream of the compressor, and an intake throttle downstream of the CAC;
a conduit coupled to the intake passage downstream of the compressor and upstream of the CAC, the conduit including a motor-driven electric compressor;
an electric compressor bypass valve coupled at a junction of the intake passage and the conduit;

one or more sensors including each of an ambient humidity sensor coupled to the intake manifold and an exhaust temperature sensor coupled to the exhaust manifold;

one or more cameras to capture images of a windshield;

an exhaust gas recirculation (EGR) passage coupling the exhaust manifold to the intake manifold, downstream of the compressor, the EGR passage including an EGR valve; and a controller with computer readable instructions stored on non-transitory memory to:
- estimate a moisture level in the exhaust manifold at an end of a drive cycle based on one or more images of the windshield, an ambient humidity as estimated via the ambient humidity sensor, a duration of engine operation, and a variation in exhaust temperature during the drive cycle; and
- in response to a higher than threshold moisture level, during an immediately subsequent vehicle key-off condition, operate the electric compressor to route compressed air through the exhaust manifold to remove moisture from the exhaust manifold.

18. The system of claim 17, wherein the one or more images of the windshield are captured during a vehicle key-off event immediately prior to the drive cycle and wherein the ambient humidity is monitored over a duration of the vehicle key-off event immediately prior to the drive cycle.

19. The system of claim 17, wherein the duration of engine operation is estimated based on each of a duration and frequency of one or more of engine start-stop events and deceleration fuel shut-off events.

20. The method of claim 1, wherein the electric air compressor is activated to expel moisture from at least the exhaust system independent of engine rotation.

* * * * *